United States Patent
Bunce

[19]

[11] Patent Number: 5,899,813
[45] Date of Patent: May 4, 1999

[54] NON-WELDED JOINT USING A POLYGON

[75] Inventor: Arthur William Bunce, Herkimer, N.Y.

[73] Assignee: Lucas Aerospace Power Transmission, Utica, N.Y.

[21] Appl. No.: 08/879,117

[22] Filed: Jun. 19, 1997

Related U.S. Application Data

[60] Provisional application No. 60/022,475, Jun. 21, 1996.

[51] Int. Cl.$^6$ .................................................. F16D 3/79
[52] U.S. Cl. ............................................ 464/99; 403/383
[58] Field of Search ................................ 464/91, 92, 88, 464/98, 99; 403/345, 361, 383

[56]  References Cited

U.S. PATENT DOCUMENTS

| | | | |
|---|---|---|---|
| 2,634,991 | 4/1953 | Stevens | 403/383 |
| 3,709,534 | 1/1973 | Coe | 403/838 |
| 3,892,107 | 7/1975 | Handen et al. | 403/383 |
| 3,942,337 | 3/1976 | Leonard et al. . | |
| 3,959,988 | 6/1976 | McNamee . | |
| 4,044,571 | 8/1977 | Wildhaber | 464/99 |
| 4,079,598 | 3/1978 | Wildhaber | 464/99 |
| 4,133,187 | 1/1979 | Wildhaber | 464/99 |
| 4,174,621 | 11/1979 | Woltjen . | |
| 4,191,030 | 3/1980 | Calistrat . | |
| 4,196,597 | 4/1980 | Robinson . | |
| 4,214,457 | 7/1980 | Wade et al. . | |
| 4,294,562 | 10/1981 | Mullenberg | 403/383 |
| 4,411,634 | 10/1983 | Hammelmann | 464/99 |
| 4,579,545 | 4/1986 | Chapman . | |
| 4,634,391 | 1/1987 | Entringer et al. . | |
| 4,737,136 | 4/1988 | Federn . | |
| 4,741,722 | 5/1988 | Federn . | |
| 4,744,783 | 5/1988 | Downey et al. . | |
| 4,747,802 | 5/1988 | Hille . | |
| 4,802,882 | 2/1989 | Heidrich . | |
| 4,928,401 | 5/1990 | Murray, Jr. . | |
| 5,000,722 | 3/1991 | Zilberman . | |
| 5,082,098 | 1/1992 | Gay et al. . | |
| 5,158,504 | 10/1992 | Stocco . | |
| 5,286,231 | 2/1994 | Zilberman et al. . | |
| 5,364,309 | 11/1994 | Heidrich et al. . | |
| 5,407,386 | 4/1995 | Kish et al. . | |
| 5,474,499 | 12/1995 | Olson . | |

FOREIGN PATENT DOCUMENTS

| | | | |
|---|---|---|---|
| 1002652 | 8/1965 | United Kingdom | 403/383 |

*Primary Examiner*—Eileen Dunn Lillis
*Attorney, Agent, or Firm*—Bond, Schoeneck & King LLP; Stephen B. Salai

[57]  ABSTRACT

A coupling is disclosed having an interference fit between its diaphragms and the spacer tube wherein the diaphragm bore and the spacer tube shaft end have mating polygonal shapes. In a preferred embodiment, the polygonal shapes are rounded, with rounded edges and comers to eliminate stress points. Localized stress areas are virtually eliminated because of the lack of concavities in the shaft end. The contact area between the diaphragm and the spacer tube thus increase the torque capacity of the coupling and eliminate fretting associated with splined joints. The coupling may be made utilizing either metallic or nonmetallic parts without loss of integrity. A method of assembling and disassembling the joint using thermal processes is also disclosed. The shaft ends are machined with the polygonal shapes and form shoulders with the central area of the shaft to serve as stops when joining the diaphragms to the shaft.

7 Claims, 4 Drawing Sheets

NON-WELDED JOINT USING A POLYGON

This application claims the benefit of U.S. Provisional Application Ser. No. 60/022,475 filed Jun. 21, 1996.

FIELD OF THE INVENTION

The present invention relates to power transmission couplings. More particularly, the invention relates to a flexible diaphragm coupling having a polygonally shaped axial bore in a diaphragm mating with a spacer tube having a polygonally shaped end and a method for assembling and disassembling such a coupling.

BACKGROUND OF THE INVENTION

Flexible power transmission couplings have been used for the transmission of rotary energy from one device to another. Power transmission couplings allow both angular and axial misalignment between rotating machinery, such as the driver and the driving end. Previously, diaphragm type couplings have used a central bore in the diaphragm with a female spline which mates with a male spline formed at the end of the interconnecting shaft. An example of a typical prior art spline coupling is shown in FIG. 1.

Splines, and other convoluted cross-sections, in the interconnections between shafts and diaphragm bores, have failed to perform well in highly stressed torque connections. The splines are typically damaged during use as the torque destroys the spline joint, resulting in inconsistencies in the coupling. The spline couplings fail, in part, because of the large number of stress points 6 created in the interconnection between the diaphragm 2 and the shaft 4. During torque transmission, stress is concentrated on these points 6 which inevitably leads to early failure of the coupling. In addition, rather than an even distribution of torque across the entire surface area of the interconnection, torque transmission is limited to sides 8 during clockwise transmission, and sides 9 during counterclockwise transmission. The limited areas of use of the interconnection during torque transmission not only results in concentrated stress areas which lead to early failure, but also limits the amount of potential torque that could be transmitted.

In addition, some spline couplings are welded together adding expense and possible distortion. Alternatively, the couplings are sometimes bolted or are used with retainers— these additional parts, however, add weight and expense to the coupling. To avoid the additional weight, distortion, and expense caused by extra parts, an interference fit between parts, created through the use of temperature changes, is sometimes used. The diaphragm is heated to allow the splined bore to expand. The shaft is cooled with liquid nitrogen to allow the external splined bore to contract. Then the diaphragm is placed on the shaft to create an interference fit between the spline's grooves. Furthermore, disassembly of a splined diaphragm and shaft, regardless of the method used for assembly, often results in at least some deformity along some part of the spline which makes either or both the diaphragm and the shaft inoperable for further use without time consuming repair.

U.S. Pat. No. 4,411,634 to Hammelmann discloses a flexible coupling having molded plastic flexible diaphragms and molded composite spacer shaft. The plastic diaphragm with an internal convoluted bore is heated, the shaft with an external convoluted surface is inserted in the bore, and the diaphragm is allowed to cool to produce a shrink fit connection between the shaft and the two flexible diaphragms. The use of plastic, however, is not satisfactory in many desired applications, and the procedure in Hammelmann could not be replicated with metal parts using the convoluted connection disclosed. Although the Hammelmann reference eliminates the sharp stress points of a conventional spline, the wavy spline of Hammelmann still encompasses a large number of stress areas, i.e., torque transmission is limited to one side or the other of a "nub". In addition, as with conventional spline cross-sections, the convoluted cross-section requires a high degree of inspection before use, will result in a large degree of fretting during use, and results in sometimes irreparable deformities upon disassembly after use.

Thus, there is a need for a coupling design which eliminates stress points and areas while enhancing torque transmission. There is further a need for a coupling design which utilizes its entire surface area of interconnection for torque transmission. There is further a need for a coupling design which is shaped for easy assembly and disassembly. There is further a need for a coupling design which is easy to inspect.

SUMMARY OF THE INVENTION

It is an object of the present invention to utilize a coupling design which enhances torque transmission by using an entire surface area of the interconnection between a diaphragm and a shaft during rotation and eliminates stress points which can cause early failure.

It is a further object of the present invention to utilize a coupling design which is easy to inspect and which can be easily assembled and disassembled without damage to parts.

It is a further object of the present invention to employ a method of assembling and disassembling metallic parts of a coupling using thermal processes.

It is a further object of the present invention to provide a joint that is capable of transmitting torque and resisting axial separation with non-chemical or non-metallurgical bonds as well as capable of resisting bending moments due to the deformation of the flexible members.

Other objects will in part be obvious and in part appear hereinafter.

In a preferred embodiment of the present invention, the invention combines the two basic elements of a flexible power transmission coupling using a convex polygon joint design. The joint design incorporates a convex polygon shape formed through the axial bore of a contoured flexible diaphragm. The diaphragm may have either a wavy or a straight profile. The joint design further incorporates a convex polygonally shaped shaft located at the end of a spacer tube. Of course, the joint may utilize two diaphragms, one at each end of the spacer tube. A shoulder is formed between the polygonally shaped shaft end and the spacer tube. When assembling the coupling, a diaphragm is placed over the shaft end and abutted with the shoulder to prevent relative displacement of the diaphragm over the spacer tube. Localized stress areas, which are created when certain sections of a periphery of a joint are not utilized during a full rotation of torque application, are eliminated in the present invention because the joint design employs a convex polygon shape as opposed to a spline or a concave polygon design. Preferably, the convex polygonal shape employs rounded corners to eliminate sharp stress points, and the shape may also employ rounded edges as desired.

The diaphragm(s) and the shaft are preferably joined with an interference shrink fit. The assembly of the elements is achieved by heating the flexible diaphragm(s) to a temperature sufficient to cause the internal diameter of the polygonal shape to expand to a size equal to or exceeding the diameter of the polygonal shape of the shaft end of the spacer tube to which it is to be joined. The parts are then joined and the diaphragm is allowed to cool. During this cooling, the bore of the diaphragm contracts on the mating spacer tube forming a press fit between the two parts. The interference fit between the two parts prevents relative motion between the parts and the convex polygon shape and interference fit transmits the torque for the application requirement. The method of joining the flexible diaphragm to the spacer tube results in a secure joint between the parts. It eliminates the need of applying excessive force on the parts at assembly to achieve a comparable joint using a shrink fit. It also eliminates the requirement for welding or using additional parts such as retainers and bolted connections which is now the common method for this joint.

The foregoing and other features and advantages of the invention will be more readily understood and fully appreciated from the following detailed description, taken in conjunction with the accompanying drawings.

DETAILED DESCRIPTION OF THE PREFERRED EMBODIMENTS

Figure 1:
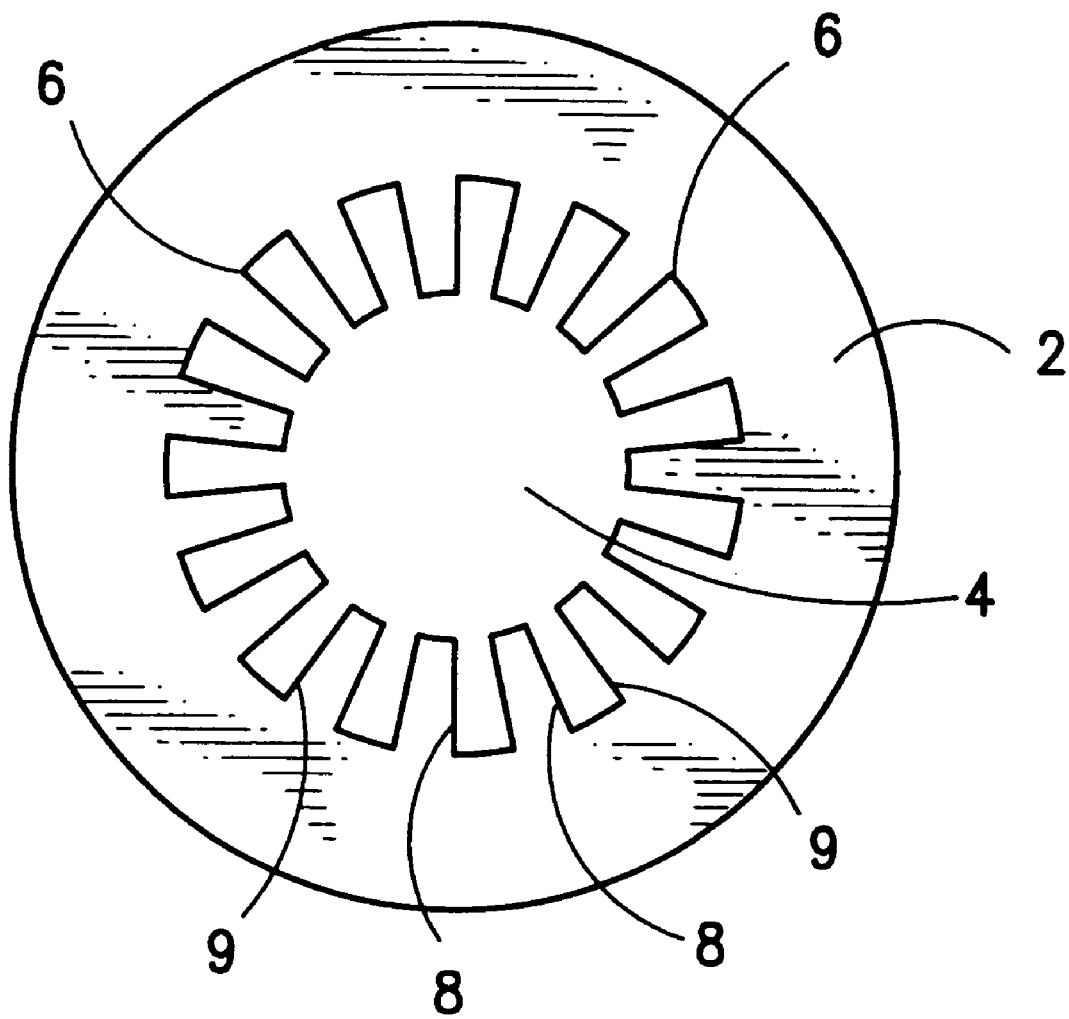
FIG. 1 is a front view of a prior art diaphragm and shaft using a spline interconnection.
Figure 2:
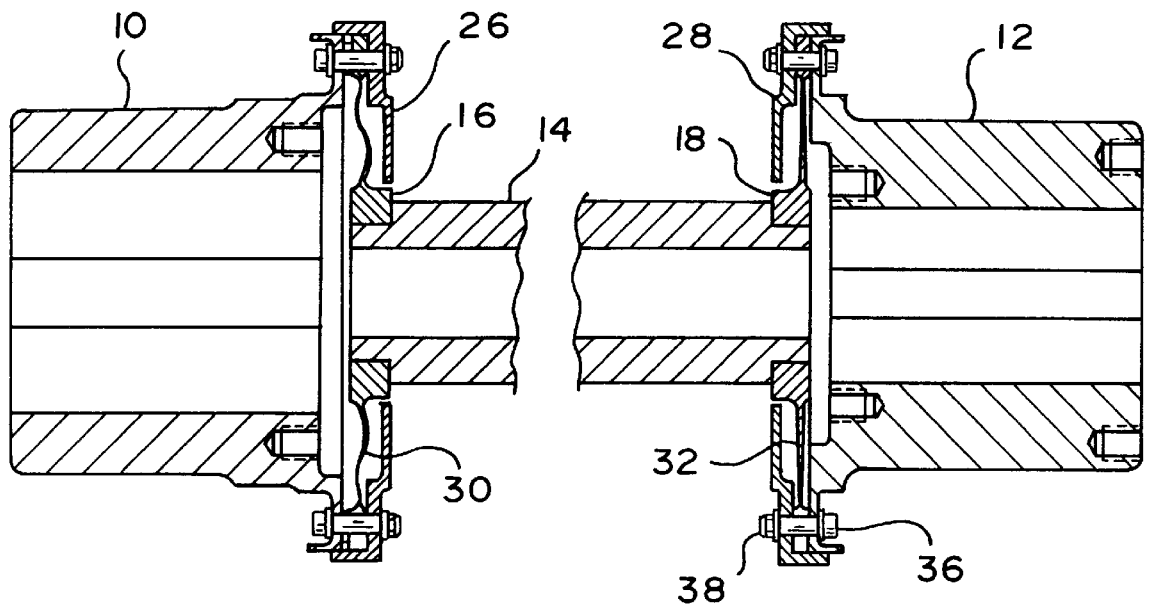
FIG. 2 is a cross sectional view of the flexible diaphragm coupling in one embodiment of the present invention.

FIG. 2 shows an assembled coupling in one preferred embodiment of the invention. The coupling comprises a drive member 10 that is adapted to fit a shaft of a rotary power device. A similar driven member 12 is adapted to fit a shaft of a rotary power driven device. The drive member 10 and driven member 12 are interconnected by a spacer tube 14 and flexible diaphragms 16 and 18. Although item 14 is termed a "tube", it should be understood that it may or may not be hollow depending on a particular application. Diaphragm shields 26 and 28 act as anti-flail devices in the event of a diaphragm failure. They also protect the exposed surfaces of the flexible diaphragms 16 and 18.

Figure 3:
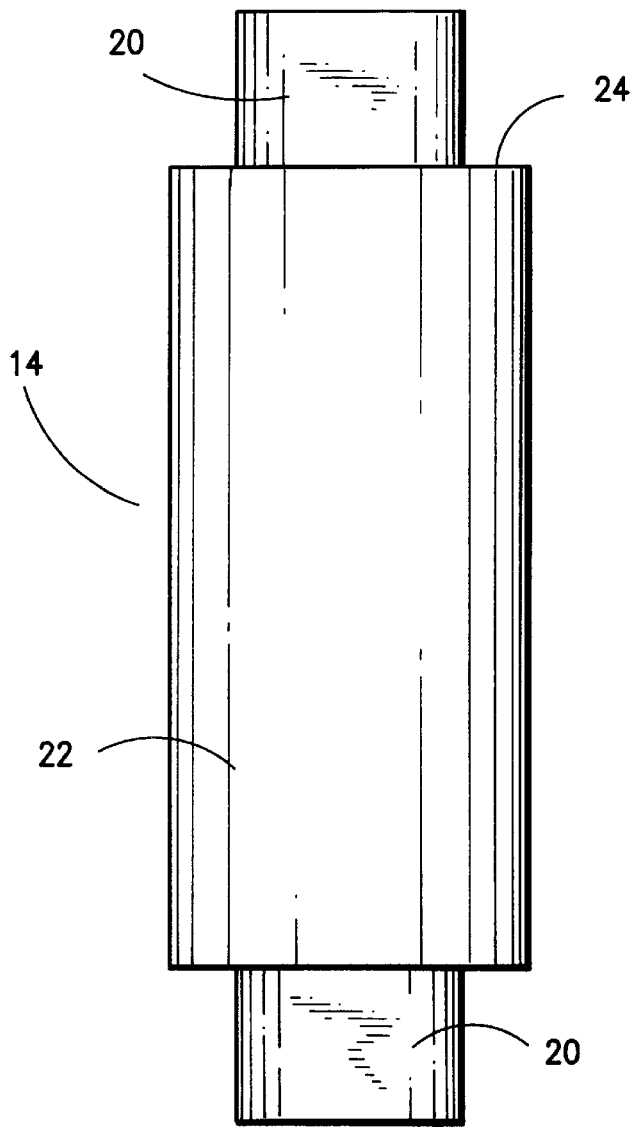
FIG. 3 is a side view of a spacer tube for the coupling of the present invention.
Figure 4A:
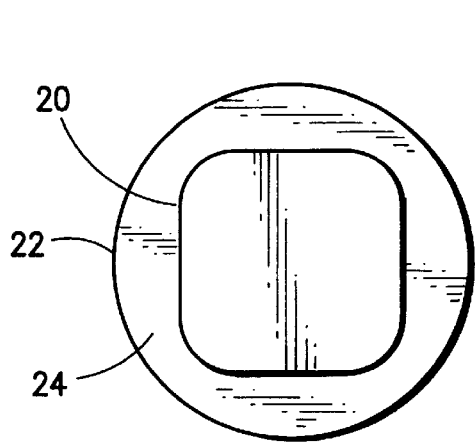
FIGS. 4A and 4B are top views different embodiments of the spacer tube in of the present invention.
Figure 4B:
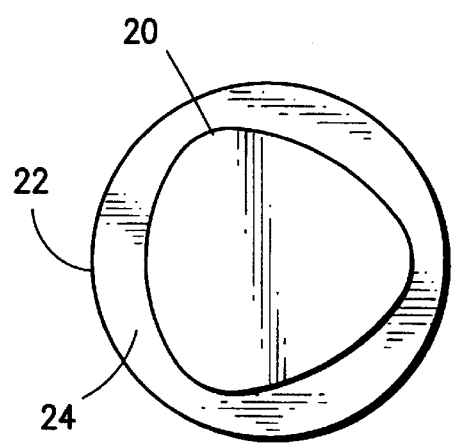

As shown in FIGS. 3, 4A, and 4B, the spacer tube 14 preferably has a convex polygon shaped shaft end 20 on a cylindrical shaft 22. The resultant shoulder 24 created by machining the convex polygon shape 20 onto the cylindrical shaft 22 is a stop for assembly of a flexible diaphragm to the spacer tube 14. The shoulder 24, typical at each end, also determines the overall length for a particular design requirement. These shoulders 24 aid in the assembly of a heated flexible diaphragm, as will be discussed, by acting as physical stops in locating the flexible diaphragms 16 and 18 to the spacer tube 14. The polygon shaped shaft end 20 is of sufficient length to accommodate the design conditions and as a minimum must equal the length of the flexible diaphragm hub. A shaft end 20 of given diameter will have approximately 35% longer fatigue life when produced as a convex polygon as compared to a conventional spline.

Referring to FIGS. 4A and 4b, the convex polygon shape of the shaft end 20 may be substantially square as shown in FIG. 4A, or may be substantially triangular as shown in FIG. 4B. As shown in both FIGS. 4A and 4B, the corners of the polygon shapes are preferably rounded to eliminate sharp stress points. As shown in FIG. 4B, the edges of the polygon shape may also be rounded to provide a smoother transition between the corners and the edges, thus further diminishing stress areas. In order for the polygon shape to remain a convex polygon, the edges are rounded convexly. Although two specific polygonal shapes are disclosed, it should be understood that other shapes employing convex polygons, with or without rounded corners and edges, are within the scope of this invention.

Figure 5A:
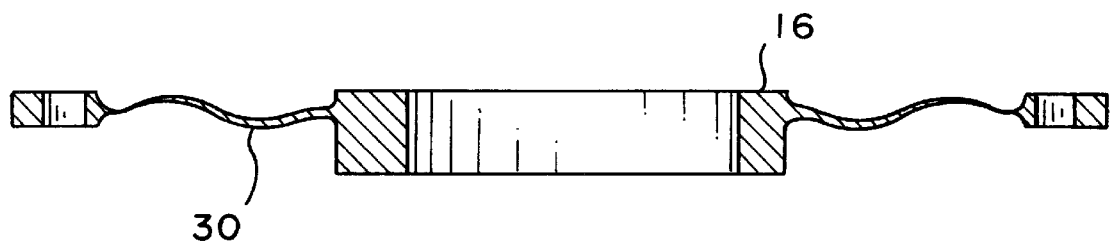
FIGS. 5A and 5B are cross-sectional views of different embodiments of diaphragms for the present invention.
Figure 5B:
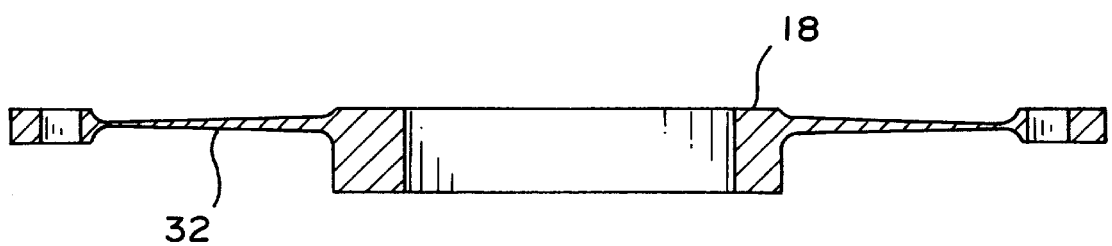

As shown in FIGS. 5A and 5B, the diaphragms may have a wavy profile 30, as shown in diaphragm 16, or a straight profile 32, as shown in diaphragm 18, depending on their use. The wavy profile accommodates the outward radial strain resulting from the fitting together of the pieces, while a diaphragm without the wavy profile may buckle or "oil can" which can be detrimental. Either profile may be used for either diaphragm, and the configuration shown in FIG. 2 is for exemplary purposes only.

Figure 6:
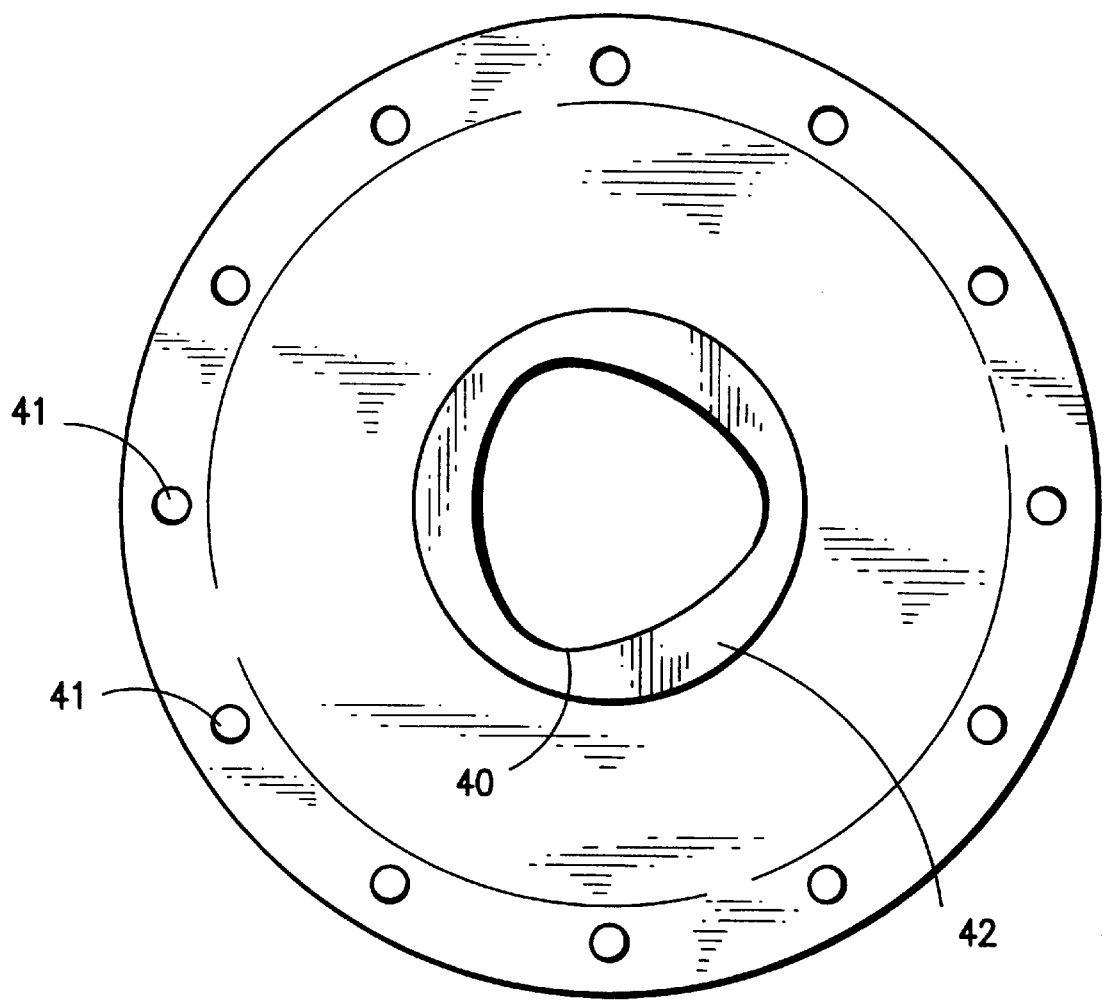
FIG. 6 is a top view of a diaphragm in one embodiment of the present invention.

The diaphragm shield and diaphragm are attached to the driver and driven members by a series of equally spaced bolts 36 and nuts 38 as shown in FIG. 2. The flexible diaphragms 16 and 18 have a rounded polygon shaped bore 40 which is formed concentric to the mounting bolt holes 41 as shown in FIG. 6. Preferably, the bore 40 is sized in such a way that its effective size is smaller than the spacer tube polygon shaped shaft end 20.

The difference between the effective diameters of the flexible diaphragm and spacer tube is sized in such a way that the hoop stress imposed on the mating items and the axial force capacity of the joint will meet design requirements for the size of the flexible diaphragm. The amount of torque transmitted from the tube 14 to the diaphragm is proportional to the surface area of the joint transmitting the torque, thus, the shafts are designed with the largest possible convex polygonal cross-sections. The maximum safe load, however, which can be transmitted by the coupling is generally limited by the strength of the hub 42 of the diaphragm. The hub section 42 of the diaphragm is the section in which the bore 40 passes. The ideal situation occurs when hub strength of hub 42 and shaft strength of shaft 20 are properly matched.

A shrink fit joint between the flexible diaphragms 16, 18 and spacer tube 14 may be made by uniformly heating the flexible diaphragms 16, 18 to a temperature sufficient to expand the flexible diaphragm bores 40 to slightly greater than the effective diameter of the spacer tube polygon diameter. The diaphragm shields 26, 28 are placed over the spacer tube 14. The heated flexible diaphragms 16, 18 are then slipped onto the spacer tube 14 and positioned against the shoulders 24 on the spacer tube 14. This is typical for each end. As the flexible diaphragms 16, 18 cool, they contract producing a shrink fit joint of the flexible diaphragms 16, 18 to the spacer tube 14. The shrink fit joint rigidly secures the flexible diaphragms 16, 18 to the shaft ends 20.

Alternatively, a shrink fit joint can also be made by cooling the spacer tube 14 to a temperature sufficient to contract the effective diameter of the spacer tube diameter to be smaller than the effective diameter of the flexible diaphragm polygon bores 40. The spacer tube 14 will then expand as the shaft warms up forming the desired shrink fit joint. Alternatively, the flexible diaphragms 16, 18 may be heated and the spacer tube 14 cooled to produce the same results of a shrink fit.

When the coupling needs to be disassembled, for repair or other reason, the above described processes for assembly may be easily reversed without damaging the parts, due to the lack of concavities in the polygon shaped shaft ends 20. Thus, the present invention provides for a joint that is capable of being disassembled and reassembled with the use of thermal processes with no loss of integrity, while at the same time is self sufficient without the use of additional hardware to secure it in place for proper functioning.

The above described coupling thus provides numerous advantages over the prior art. The coupling of the present invention allows for an increased accuracy of machining and inspecting versus a splined configuration because of the easy to follow interference surface line in the joint between the diaphragm and the spacer tube. The joint can be of dissimilar metals, with special coatings as required, versus a welded configuration. In addition, the polygon joint would eliminate the added NDT (Non Destructive Test) inspection of a welded joint design, including ultrasonic and magnetic particle inspection. The polygon joint is also preferred over a bolted joint because it is lighter and uses less parts. Thus, the cost of the polygon joint is less than a welded or otherwise retained method. The joint can advantageously be either nonmetallic, e.g. plastic, or metallic because the polygon shaped joint allows for any suitable materials to utilize the thermal assembly method of the present invention to adequately form the joint. Furthermore, the increased surface area of the joint will decrease the fretting condition commonly found with a splined joint. The polygon joint has an average 35% increased torque capacity over a spline joint of the same hub length and diameter. The increased contact area of the joint also allows for a greater axial load capability than a splined joint. In addition, a very short BSE (basic dimension between mating shaft ends) length of unit may be obtained with the polygon joint design.

The above description is illustrative and not restrictive. Variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A power transmission coupling for transmitting rotary energy from a first device to a second device, the coupling allowing both angular and axial misalignment between the first and second devices, the coupling comprising:
   a coupling shaft having a first end;
   a first shaft end extending from the first end and having a substantially triangular shaped cross-section with three convexly rounded corners and three convexly rounded sides; and,
   a first diaphragm having a bore, the bore having a cross-section which substantially matches the cross-section of the first shaft end;
   wherein the first diaphragm and the first shaft end are joined together by an interference shrink fit and wherein torque is transmitted at all points along connecting surfaces of the first diaphragm and the first shaft end during a full unidirectional rotation of the coupling shaft.

2. The coupling of claim 1 further comprising a second end on the coupling shaft, a second shaft end extending from the second end and having a convex polygonally shaped cross-section, and a second diaphragm having a bore with a cross-section which substantially matches the cross-section of the second shaft end.

3. The coupling of claim 2 wherein at least one of the first and second diaphragm has a wavy profile.

4. The coupling of claim 2 wherein at least one of the first and second diaphragm has a straight profile.

5. The coupling of claim 1 further comprising a shoulder formed between the first end of the coupling shaft and the first shaft end, wherein the first diaphragm is precluded from movement along the coupling shaft by the shoulder.

6. The coupling of claim 1 wherein the first shaft end and the first diaphragm are metallic.

7. A coupling for transmitting rotary energy from a first device to a second device, the coupling allowing both angular and axial misalignment between the first and second devices, the coupling comprising:
   a cylindrical coupling shaft having a first end and a second end;
   a metallic first shaft end extending from the first end and having a substantially triangularly shaped cross-section with rounded corners and rounded sides;
   a first shoulder formed between the first shaft end and the first end;
   a metallic second shaft end extending from the second end and having a substantially triangularly shaped cross-section with rounded corners and rounded sides;
   a second shoulder formed between the second shaft end and the second end;
   a metallic first diaphragm having a bore, the bore having a cross-section which substantially matches the cross-section of the first shaft end, wherein the first diaphragm is placed over the first shaft end and abuts the first shoulder;
   a metallic second diaphragm having a bore, the bore of the second diaphragm having a cross-section which substantially matches the cross-section of the second shaft end, wherein the second diaphragm is placed over the second shaft end and abuts the second shoulder;
   a first interference joint formed by connecting surfaces of the first shaft end and the bore of the first diaphragm; and,
   a second interference joint formed by connecting surfaces of the second shaft end and the bore of the second diaphragm;
   wherein torque is transmitted at all points along the connecting surfaces of the first interference joint and along the connecting surfaces of the second interference joint during a full unidirectional rotation of the cylindrical coupling shaft.

* * * * *